United States Patent
Malek et al.

(10) Patent No.: US 10,457,150 B2
(45) Date of Patent: Oct. 29, 2019

(54) VOLTAGE STACK-UP CONVERTER FOR ELECTRIFIED VEHICLE

(71) Applicant: FORD GLOBAL TECHNOLOGIES, LLC, Dearborn, MI (US)

(72) Inventors: Hadi Malek, Dearborn, MI (US); Shuitao Yang, Canton, MI (US); Yan Zhou, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 15/617,592

(22) Filed: Jun. 8, 2017

(65) Prior Publication Data

US 2018/0354371 A1  Dec. 13, 2018

(51) Int. Cl.
*B60L 11/18* (2006.01)
*H02M 3/335* (2006.01)
*B60L 15/00* (2006.01)

(52) U.S. Cl.
CPC .......... *B60L 11/18* (2013.01); *B60L 15/007* (2013.01); *H02M 3/33584* (2013.01); *B60L 2210/14* (2013.01); *B60L 2210/30* (2013.01); *B60L 2210/40* (2013.01); *B60L 2210/42* (2013.01); *B60L 2240/527* (2013.01); *B60L 2240/547* (2013.01)

(58) Field of Classification Search
CPC combination set(s) only.
See application file for complete search history.

(56) References Cited

U.S. PATENT DOCUMENTS

| 9,484,838 | B2 | 11/2016 | Mu et al. | |
|---|---|---|---|---|
| 9,537,445 | B2 * | 1/2017 | Adest | G01R 31/40 |
| 2010/0142227 | A1 * | 6/2010 | Min | H02J 3/38 363/13 |
| 2013/0119962 | A1 * | 5/2013 | Holmberg | H02J 1/00 323/304 |
| 2014/0167661 | A1 * | 6/2014 | van der Merwe | H02M 3/33507 318/400.3 |
| 2016/0141964 | A1 * | 5/2016 | Yu | H02M 3/33507 363/21.02 |

FOREIGN PATENT DOCUMENTS

CN  203056977 U  7/2013

OTHER PUBLICATIONS

Machine Translation of CN203056977U, 7 pages.

* cited by examiner

*Primary Examiner* — Daniel Kessie
(74) *Attorney, Agent, or Firm* — David Kelley; Brooks Kushman P.C.

(57) ABSTRACT

A power conversion system includes a power converter having output terminals that are electrically isolated from input terminals. The power conversion system further includes a circuit configured to couple a voltage input from a power source to the input terminals, and provide an output voltage to a load that is a series combination of the voltage input and a voltage across the output terminals.

19 Claims, 4 Drawing Sheets

VOLTAGE STACK-UP CONVERTER FOR ELECTRIFIED VEHICLE

TECHNICAL FIELD

This application is generally related to a power converter for electrified vehicle applications.

BACKGROUND

Electrified vehicles include hybrid electric vehicles (HEV) and battery electric vehicles (BEV). Electrified vehicles include a traction battery to store energy to be used for propulsion and other purposes. The traction battery is configured to operate in a particular voltage range. However, improved performance of electric machines may be achieved by operating in a different voltage range, typically at higher voltages than the traction battery. Many electrified vehicles include a variable voltage converter to convert the voltage of the traction battery to a voltage level desired by the electric machines.

SUMMARY

A vehicle includes an isolated power converter with input terminals coupled to a power source and a load coupled across a series combination of an output of the isolated power converter and the power source. The vehicle further includes a controller programmed to operate the isolated power converter such that a ratio of power delivered to the input terminals of the isolated power converter to a total power delivered to the load is less than a predetermined ratio.

The predetermined ratio may be selected based on an efficiency of the isolated power converter. The controller may be further programmed to increase the predetermined ratio in response to the efficiency of the isolated power converter increasing. The may further include a switching element configured to selectively short across terminals of the output of the isolated power converter. The controller may be further programmed to operate the switching element to couple the load across the power source. The vehicle may further include a capacitor coupled across the series combination. The power source may be a traction battery. The isolated power converter may be configured for bi-directional operation.

A power conversion system includes a power converter having output terminals that are electrically isolated from input terminals. The power conversion system further includes a circuit configured to couple a voltage input from a power source to the input terminals, and provide an output voltage to a load that is a series combination of the voltage input and a voltage across the output terminals.

The output voltage may be greater than the voltage input. The power conversion system may further include a controller programmed to operate the power converter such that a ratio of power delivered to the input terminals of the power converter to a total power delivered to the load is less than a predetermined ratio. The predetermined ratio may be selected based on an efficiency of the power converter. The predetermined ratio may increase as an efficiency of the power converter increases. The circuit may further include a switching element disposed across the output terminals configured to selectively short circuit the output terminals. The power conversion system may further include a capacitor coupled across the series combination. The power converter may be configured for bi-directional operation.

A method includes coupling a power source to an input of an isolated power converter. The method further includes coupling an output of the isolated power converter in series with the power source to provide power to an electrical load. The method further includes operating the isolated power converter at a power level such that a ratio of power provided to the isolated power converter to a total power delivered to the electrical load is less than a predetermined ratio.

The predetermined ratio may be based on an efficiency of the isolated power converter. The predetermined ratio may increase as the efficiency increases. The predetermined ratio may be selected such that a power loss associated with providing power to the electrical load is less than a conversion power loss associated with using an output of a non-isolated power converter across the electrical load.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
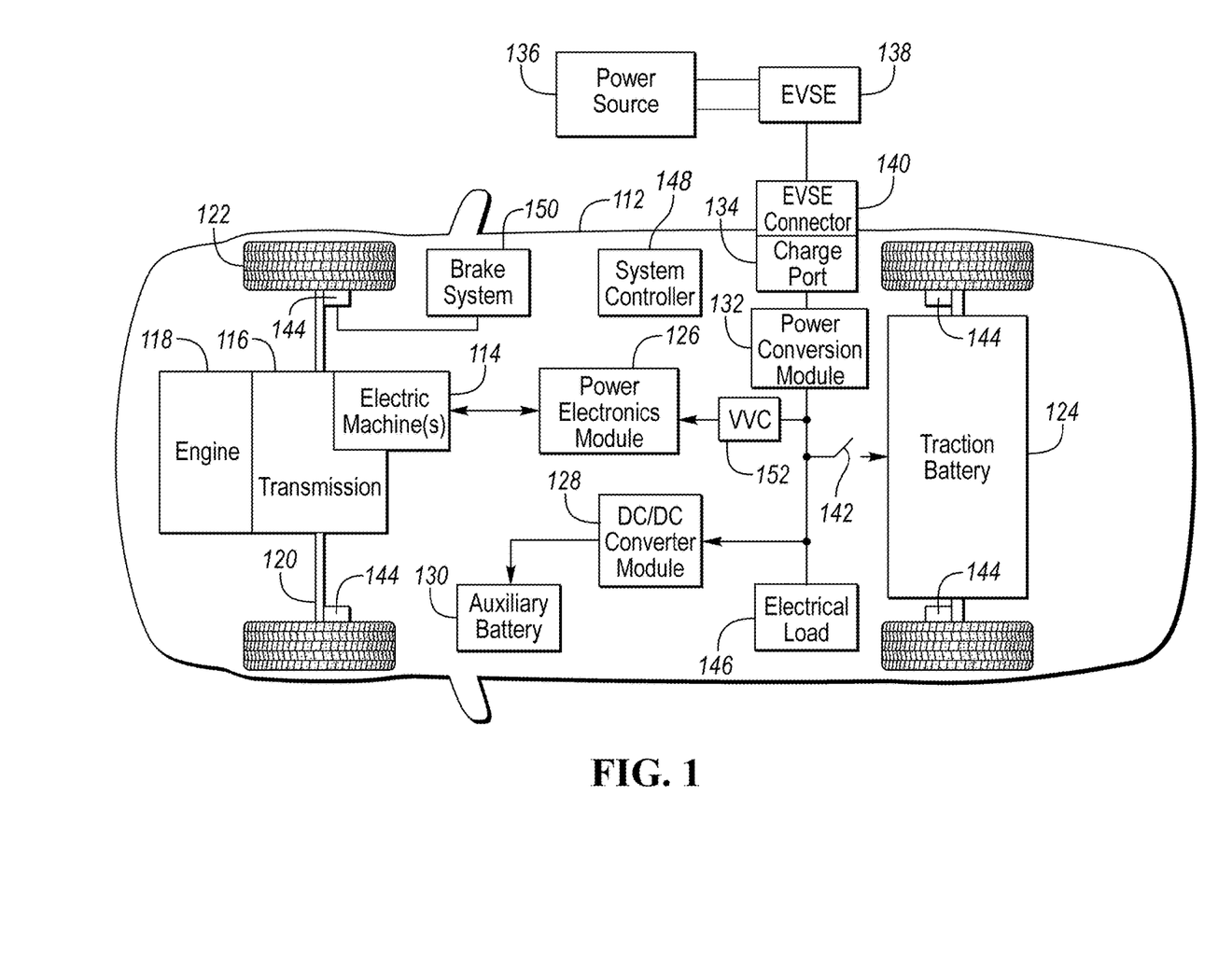
FIG. 1 is a diagram of a hybrid vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
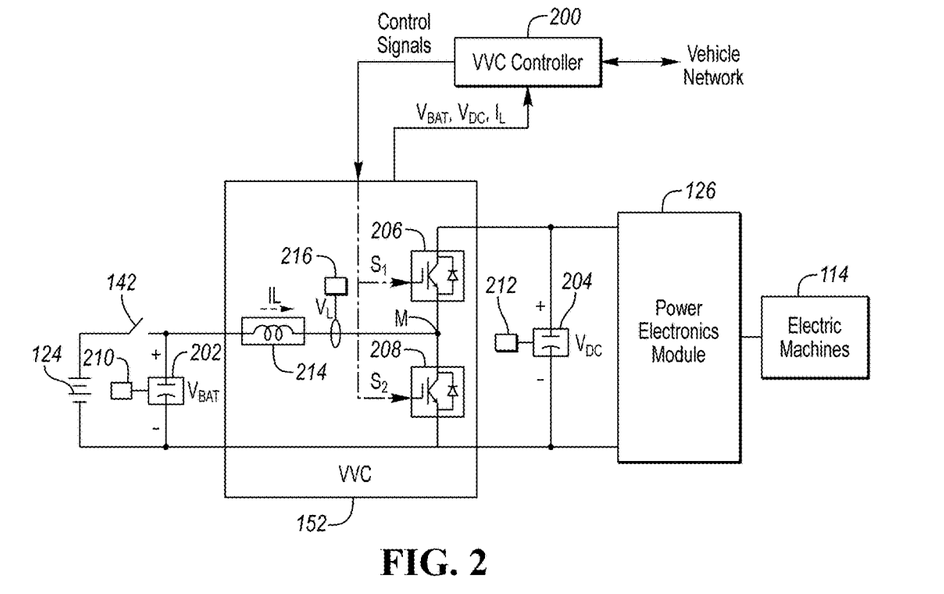
FIG. 2 is a diagram of a possible variable voltage converter configuration.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The control signal at which the VVC 152 is operated may be directly related to the amount of voltage boost to be provided by the VVC 152.

Further referencing FIG. 2, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The output voltage of the VVC 152 may be controlled to achieve a desired reference voltage. In some configurations, the VVC 152 may be a boost converter. In a boost converter configuration in which the VVC controller 200 controls the duty cycle of the control signal to the first switching device 206 and the second switching device 208, the ideal relationship between the input voltage $V_{in}$ and the output voltage $V_{out}$ and the duty cycle D may be illustrated using the following equation:

$$V_{out} = \frac{V_{in}}{(1-D)} \quad (1)$$

The desired duty cycle, D, may be determined by measuring the input voltage (e.g., traction battery voltage) and setting the output voltage to the reference voltage. The duty cycle, D, may represent the duty cycle for the first switching device 206. The second switching device 208 may be operated at a duty cycle that is the complement of D (e.g., 100%−D). The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

Referencing FIG. 2, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a predetermined switching frequency. Within each cycle of the switching frequency, the switching devices 206, 208 may be operated at a specified duty cycle. The duty cycle defines the amount of time that the selected switching device is in an on-state and an off-state. For example, a duty cycle of 100% may operate a selected switching device in a continuous on-state with no turn off. A duty cycle of 0% may operate a selected switching device in a continuous off-state with no turn on. A duty cycle of 50% may operate a selected switching device in an on-state for half of the cycle and in an off-state for half of the cycle. The control signals for the two switches 206, 208 may be complementary. That is, the control signal provided to the first switching device 206 may be an inverted version of the control signal provided to the second switching device 208. For example, if the first switching device 206 is on, then the second switching device 208 should be off.

Power converters may be categorized as non-isolated and isolated. A non-isolated power converter may be a power converter in which there is an electrical path between the input and the output of the converter. The input and output of the non-isolated converter may share a common ground or terminal. In contrast, an isolated converter provides Galvanic isolation (e.g., electrical separation) between the input and output. In an isolated converter, there is no direct conductive path between the input and the output. An isolated converter may include a transformer between the input and the output to achieve the electrical separation.

Figure 3:
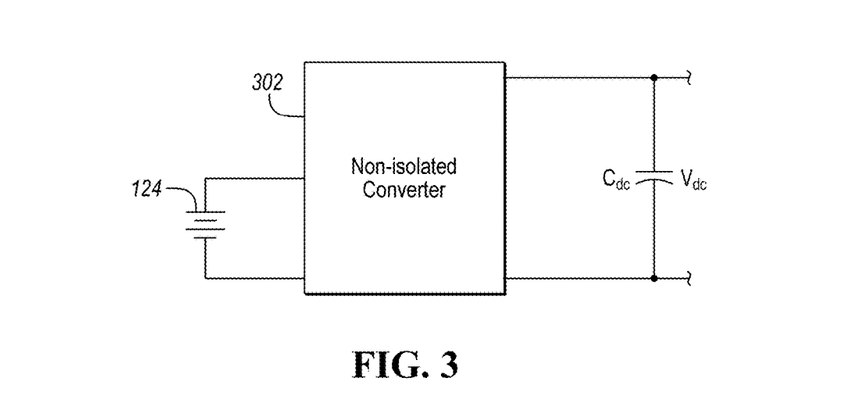
FIG. 3 is a block diagram for a power conversion system using a non-isolated power converter.

FIG. 3 depicts an example of a power conversion system that uses a non-isolated converter 302. For example, the VVC 152 depicted in FIG. 2 is an example of a non-isolated converter. The non-isolated converter 302 may include other non-isolated converter configurations. A power input, $P_b$, may be provided by the traction battery 124 or a high-voltage bus. The power input, $P_b$, may be defined as the product of the voltage across the input terminals of the non-isolated converter 302 and the current flowing into the non-isolated converter 302 from the traction battery 124 and/or high-voltage bus. That is, $P_b$ represents the power provided by the power source. As the current flows through the non-isolated converter 302, there may be power losses. For example, resistive elements may cause a power loss (e.g., $I^2R$). The switching devices 206, 208 may be characterized by switching and conducting losses. The power output from the converter may be defined as the product of the voltage across the output terminals of the non-isolated converter 302 and the current flowing from the non-isolated converter 302 to the load. The ratio of the power output to the power input may be defined as the efficiency, η, of the converter. The efficiency is typically less than one due to the power losses. The power loss, $P_{loss}$, may be expressed as:

$$P_{loss} = (1-\eta)P_b \qquad (1)$$

The power delivered to the load is equal to $\eta P_b$. For the non-isolated converter 302, the power loss is based on the power input to the converter. Since all power passes through the non-isolated converter 302, the entire input power, $P_b$, is subject to the losses. It is generally desired to minimize the power losses of the system.

Figure 4:
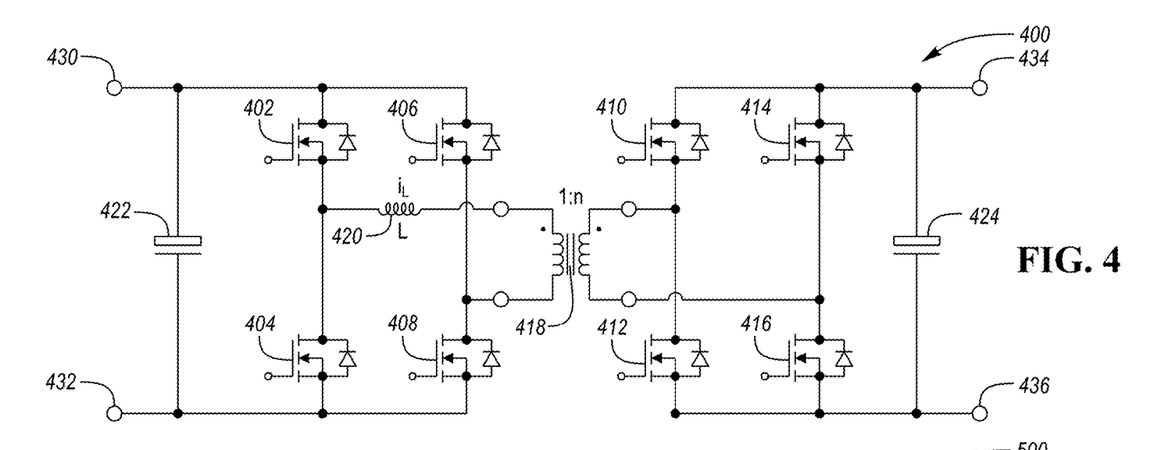
FIG. 4 is a first possible configuration for an isolated power converter.
Figure 6:
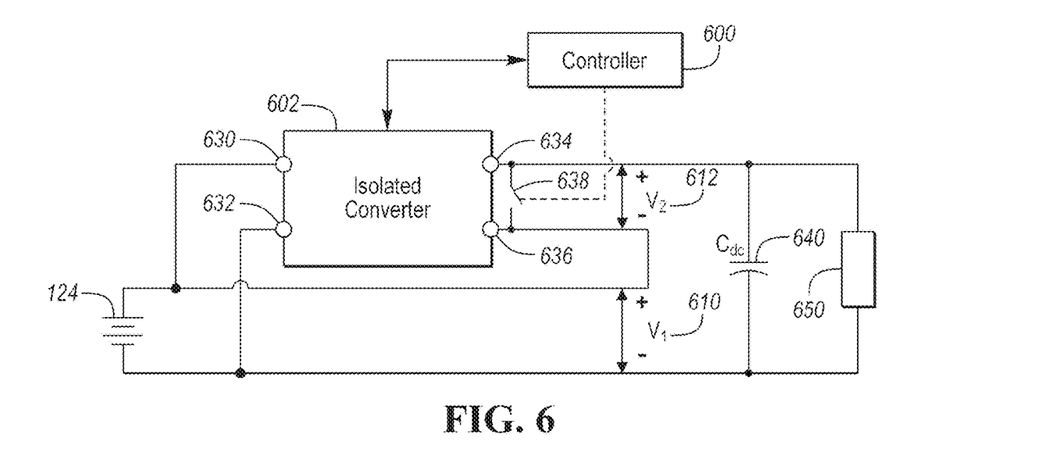
FIG. 6 is a diagram depicting a circuit for a power conversion system using an isolated power converter.

FIG. 6 depicts an improved converter topology for improving the power losses. The topology of FIG. 6 includes an isolated converter 602 that is connected in series with the traction battery 124 and/or high-voltage bus. Various configurations are available for the isolated converter 602. For example, FIG. 4 depicts a diagram of a first isolated converter 400 which may be referred to as a dual active bridge converter. The isolated converter 400 may include a transformer 418 having a turns ratio of 1:n. The transformer 418 includes a primary-side winding and a secondary-side winding. The value of n may be selected to achieve a predetermined voltage magnitude increase at the secondary-side winding. The first isolated converter 400 may include a first input terminal 430 and a second input terminal 432. A capacitor 422 may be coupled across the input terminals 430 and 432. The first isolated converter 400 may include an inductor 420 in series with the primary-side winding of the transformer 418.

The input terminals 430 and 432 may be coupled to an input stage that includes a plurality of input-stage switching devices 402, 404, 406, 408. The input-stage switching devices 402, 404, 406, 408 may be solid-state switching elements. For example, the input-stage switching devices may be N-channel metal oxide semiconductor field-effect transistors (MOSFET). The input-stage switching devices may be other transistor types including insulated gate bipolar transistors (IGBT). The input stage switching devices 402, 404, 406, 408 may include diodes across the associated device. The diodes may represent the intrinsic body diode in some configurations (e.g., MOSFET).

The input-stage switching devices 402, 404, 406, 408 may be arranged to selectively couple the input terminal 430 and 432 to the series combination of the inductor 420 and the primary-side winding of the transformer 418. For example, switching device 402 may selectively couple the first input terminal 430 to a first lead of the inductor 420. Switching device 404 may selectively couple the second input terminal 432 to the first lead of the inductor 420. A second lead of the inductor 420 may be coupled to a first terminal of the primary-side winding of the transformer 418. Switching device 406 may selectively couple the first input terminal 430 to a second terminal of the primary-side winding of the transformer 418. Switching device 408 may selectively couple the second input terminal 432 to the second terminal of the primary-side winding of the transformer 418.

The input-stage switching devices 402, 404, 406, 408 may be controlled by a controller (e.g., VVC controller 200). For example, the controller 200 may provide gate drive signals to activate and deactivate the input-stage switching devices 402, 404, 406, 408. The input-stage switching devices 402, 404, 406, 408 may be operated to cause energy transfer through the transformer 418.

The secondary-side winding of the transformer 418 may be coupled to an output stage that includes a plurality of output-stage switching devices 410, 412, 414, 416. The output-stage switching devices 410, 412, 414, 416 may be solid-state switching elements. For example, the output-stage switching devices may be N-channel metal oxide semiconductor field-effect transistors (MOSFET). The output-stage switching devices may be other transistor types including insulated gate bipolar transistors (IGBT). The output stage switching devices 410, 412, 414, 416 may include diodes across the associated device. The diodes may represent the intrinsic body diode in some configurations (e.g., MOSFET).

The output-stage switching devices 410, 412, 414, 416 may be arranged to selectively couple the secondary-side winding of the transformer 418 to a first output terminal 434 and a second output terminal 436. For example, switching device 410 may selectively couple a first terminal of the secondary-winding of the transformer 418 to the first output terminal 434. Switching device 412 may selectively couple the first terminal of the secondary winding of the transformer 418 to the second output terminal 436. Switching device 414 may selectively couple a second terminal of the secondary-side winding of the transformer 418 to the first output terminal 434. Switching device 416 may selectively couple the second terminal of the secondary-side winding of the transformer 418 to the second output terminal 436. A smoothing capacitor 424 may be coupled between the first output terminal 434 and the second output terminal 436 to smooth the resulting voltage output.

The controller 200 may be configured to operate the input stage to generate an alternating current (AC) signal to the primary-side winding of the transformer 418. The AC signal then induces a current in the secondary-side winding of the transformer 418.

The control signals sent by the controller 200 to the isolated converter 400 may be configured to drive the input stage switching devices 402, 404, 406, 408 with PWM signals at a predetermined switching frequency. Within each cycle of the switching frequency, the input stage switching devices 402, 404, 406, 408 may be operated at a specified duty cycle. The duty cycle defines the amount of time that the switching devices 402, 404, 406, 408 are in an on-state and an off-state. For example, a duty cycle of 100% may operate the input stage switching devices 402, 404, 406, 408 in a continuous on-state with no turn off. A duty cycle of 0% may operate the input stage switching devices 402, 404, 406, 408 in a continuous off-state with no turn on. A duty cycle of 50% may operate the input stage switching devices 402, 404, 406, 408 in an on-state for half of the cycle and in an off-state for half of the cycle. The control signals for the input stage switching devices 402, 404, 406, 408 may be complementary. That is, the control signal sent to one of the switching devices (e.g., 402) may be an inverted version of the control signal sent to the complementary switching device (e.g., 404). Such operation ensures that an output is not connected to both input terminals 430, 432 at the same time (e.g., prevents shorting input terminals 430, 432 together). In some configurations, the duty cycle may be varied based on feedback signals (e.g., voltage or current feedback) to achieve a target voltage or current to the transformer.

The controller 200 may be configured to operate the output stage to generate a direct current (DC) signal to a connected electrical load. The output-stage may operate as a rectifier (e.g., via body diodes) to convert the AC signal to a DC signal at the output terminals. The controller may operate the output-stage switching devices 410, 412, 414, 416 to achieve the rectification. The isolated converter 400 may be bi-directional such that power may be transferred in the opposite direction. That is, power from the output stage may be transferred back to the input stage. For example, during regenerative braking, the inverter may return power from the electric machines to the traction battery through the isolated converter 400. The controller 200 may provide control signals to operate the output stage switching devices 410, 412, 414, 416 to pass power back to the input stage. Note that in the bi-directional mode of operation, the roles of the input stage and output stage previously described may be reversed. That is, the output stage may be operated to generate an AC signal and the input stage may be operated to rectify the AC signal to a DC signal at the input terminals 430, 432.

Figure 5:
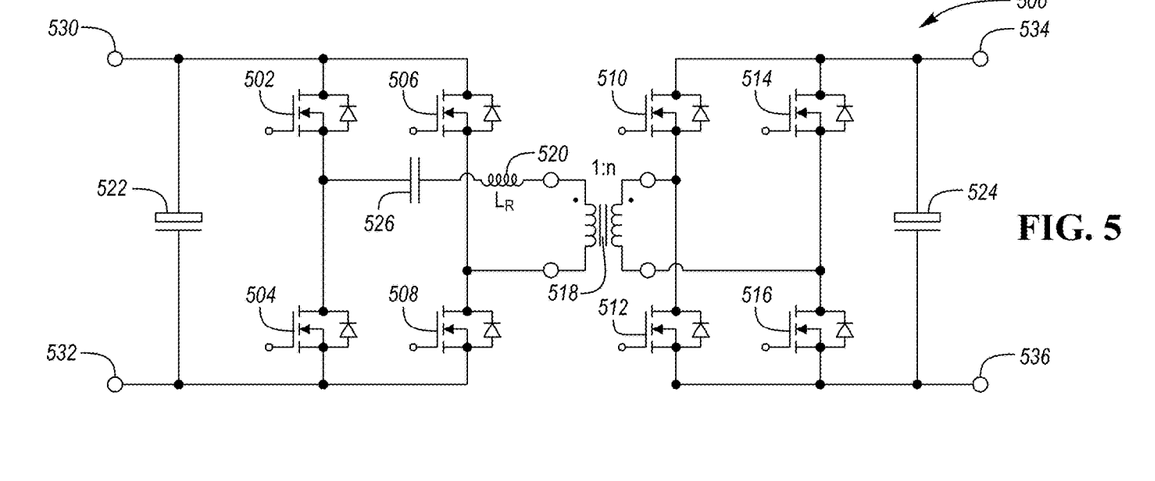
FIG. 5 is a second possible configuration for an isolated power converter.

In another example, FIG. 5 depicts a diagram of a second isolated converter 500 which may be referred to as a series resonant converter. The isolated converter 500 may include a transformer 518 having a turns ratio of 1:n. The transformer 518 includes a primary-side winding and a secondary-side winding. The value of n may be selected to achieve a predetermined voltage magnitude increase at the secondary-side winding. The second isolated converter 500 may include a first input terminal 530 and a second input terminal 532. A capacitor 522 may be coupled across the input terminals 530 and 532. The second isolated converter 500 may include an inductor 520 and a second capacitor 526 in connected in series with an input side of the transformer 518. In some configurations, the inductor 520 may be integrated into the transformer 518.

The input terminals 530 and 532 may be coupled to an input stage that includes a plurality of input-stage switching devices 502, 504, 506, 508. The input-stage switching devices 502, 504, 506, 508 may be solid-state switching elements. For example, the input-stage switching devices may be N-channel metal oxide semiconductor field-effect transistors (MOSFET). The input-stage switching devices may be other transistor types including insulated gate bipolar transistors (IGBT). The input stage switching devices 502, 504, 506, 508 may include diodes across the associated device. The diodes may represent the intrinsic body diode in some configurations (e.g., MOSFET).

The input-stage switching devices 502, 504, 506, 508 may be arranged to selectively couple the input terminals 530 and 532 to the series combination of the inductor 520, second capacitor 526, and the primary-side winding of the transformer 518. For example, switching device 502 may selectively couple the first input terminal 530 to a first lead of the second capacitor 526. Switching device 504 may selectively couple the second input terminal 532 to the first lead of the second capacitor 526. A second lead of the second capacitor 526 may be coupled to a first lead of the inductor 420. A second lead of the inductor 520 may be coupled to a first terminal of the primary-side winding of the transformer 518. Switching device 506 may selectively couple the first input terminal 530 to a second terminal of the primary-side winding of the transformer 518. Switching device 508 may selectively couple the second input terminal 532 to the second terminal of the primary-side winding of the transformer 518.

The input-stage switching devices 502, 504, 506, 508 may be controlled by a controller (e.g., VVC controller 200). For example, the controller 200 may provide gate drive signals to activate and deactivate the input-stage switching devices 502, 504, 506, 508. The input-stage switching devices 502, 504, 506, 508 may be operated to cause energy transfer through the transformer 518.

The secondary-side winding of the transformer 518 may be coupled to an output stage that includes a plurality of output-stage switching devices 510, 512, 514, 516. The output-stage switching devices 510, 512, 514, 516 may be solid-state switching elements. For example, the output-stage switching devices may be N-channel metal oxide semiconductor field-effect transistors (MOSFET). The output-stage switching devices may be other transistor types including insulated gate bipolar transistors (IGBT). The output stage switching devices 510, 512, 514, 516 may include diodes across the associated device. The diodes may represent the intrinsic body diode in some configurations (e.g., MOSFET).

The output-stage switching devices 510, 512, 514, 516 may be arranged to selectively couple the secondary-side winding of the transformer 518 to a first output terminal 534 and a second output terminal 536. For example, switching device 510 may selectively couple a first terminal of the secondary-winding of the transformer 518 to the first output terminal 534. Switching device 512 may selectively couple the first terminal of the secondary winding of the transformer 518 to the second output terminal 536. Switching device 514 may selectively couple a second terminal of the secondary-side winding of the transformer 518 to the first output terminal 534. Switching device 516 may selectively couple the second terminal of the secondary-side winding of the transformer 518 to the second output terminal 536. A smoothing capacitor 524 may be coupled between the first output terminal 534 and the second output terminal 536 to smooth the resulting voltage output.

The controller 200 may be configured to operate the input stage to generate an alternating current (AC) signal to the primary-side winding of the transformer 518. The AC signal then induces a current in the secondary-side winding of the transformer 518.

The control signals sent by the controller 200 to the isolated converter 500 may be configured to drive the input stage switching devices 502, 504, 506, 508 with PWM signals at a switching frequency. Within each cycle of the switching frequency, the input stage switching devices 502, 504, 506, 508 may be operated at a specified duty cycle. The duty cycle defines the amount of time that the switching devices 502, 504, 506, 508 are in an on-state and an off-state. The control signals for the input stage switching devices 502, 504, 506, 508 may be complementary. That is, the control signal sent to one of the switching devices (e.g., 502) may be an inverted version of the control signal sent to the complementary switching device (e.g., 504). Such operation ensures that an output is not connected to both input terminals 530, 532 at the same time (e.g., prevents shorting input terminals 530, 532 together). In some configurations, the duty cycle may be varied based on feedback signals (e.g., voltage or current feedback) to achieve a target voltage or current to the transformer. The switching frequency may be selected relative to a resonant frequency that may be defined by the second capacitor 526, inductor 520, and the primary-side winding of the transformer 518.

The controller 200 may be configured to operate the output stage to generate a direct current (DC) signal to a connected electrical load. The output-stage may operate as a rectifier (e.g., via body diodes) to convert the AC signal to a DC signal at the output terminals. The controller may operate the output-stage switching devices 510, 512, 514, 516 to achieve the rectification. The isolated converter 500 may be bi-directional such that power may be transferred in the opposite direction. That is, power from the output stage may be transferred back to the input stage. For example, during regenerative braking, the inverter may return power from the electric machines to the traction battery through the isolated converter 500. The controller 200 may provide control signals to operate the output stage switching devices 510, 512, 514, 516 to pass power back to the input stage. Note that in the bi-directional mode of operation, the roles of the input stage and output stage previously described may be reversed. That is, the output stage may be operated to generate an AC signal and the input stage may be operated to rectify the AC signal to a DC signal at the input terminals 530, 532.

FIG. 6 depicts a possible power conversion system for power distribution in an electrified vehicle. A power source and the output stage of the isolated converter 602 are coupled in series to provide a voltage for an electrical load 650. The power source may include the traction battery 124 and the high-voltage bus. The power conversion system may include a circuit configured to couple a voltage input from the power source to the input terminals 630, 632 of the isolated power converter 602, and provide an output voltage to a load 650 that is a series combination of the voltage input and a voltage across the output terminals 634, 636 of the isolated power converter 602. The voltage output of the series configuration is a summation of the voltage of the power source and the voltage output of the isolated converter 602. For example, the isolated converter 602 may be configured as in FIG. 4 or FIG. 5. The input terminals 630, 632 of the isolated converter 602 may be electrically coupled to terminals of the traction battery 124 such that the input voltage across the input terminals is equivalent to the traction battery voltage.

The resulting power conversion system can provide a boosted voltage to the electrical load 650. The power flow from the power source to the electrical load 650 may have two paths. A first path flows from the traction battery 124 and/or high-voltage bus to the electrical load 650. The first path may be referred to as the direct path. A second path flows from the traction battery 124 and/or high-voltage bus through the isolated converter 602 to the electrical load 650. The second path may be referred to as the indirect path. The indirect path provides the voltage boost through the isolated converter 602.

The power conversion system may include a controller 600 that is configured to monitor and control the operation of the isolated power converter 602. The controller 600 may include a processor for executing a program and memory for storing the program and data. The memory may include volatile and non-volatile memory. The controller 600 may include interface circuitry to interface with one or more voltage and current sensors. The controller 600 may include interface circuitry for controlling a plurality of gate terminals of solid-state switching devices. The controller 600 may include timers and counters that may be used for coordinating the timing of various input and output operations. The controller 600 may include a communication interface for communicating with other electronic modules within the vehicle.

The power converter system may include a voltage sensor that is configured to measure the voltage across the output (e.g., $V_2$) of the isolated power converter 602. The power converter system may include a voltage sensor that is configured to measure the voltage across the power source (e.g., $V_1$). The power converter system may include a voltage sensor that is configured to measure the voltage across the series combination of the power source and the output of the isolated power converter 602. That is, configured to measure the voltage across the electrical load 650. The voltage sensors may interface with the controller 600 to provide voltage information for controlling the isolated power converter 602. The power converter system may further include a voltage sensor that is configured to measure the voltage across the input terminals (630, 632) of the isolated power converter 602.

The power converter system may include a current sensor that is configured to measure the current flowing into the input terminal 630 of the isolated power converter 602. The power conversion system may include a current sensor that is configured to measure the current flowing to the electrical load 650. The current sensors may interface with the controller 600 to provide current information for controlling the isolated power converter 602.

The direct path results in lower power losses as the power does not completely pass through the conversion stage. Power losses attributable to the indirect path may be computed as $$P_{loss} = (1-\eta_{iso})P_{b1} \quad (2)$$

where $\eta_{iso}$ is the efficiency associated with the isolated converter 602 and $P_{b1}$ is the amount of power input to the isolated power converter 602. The power input to the isolated power converter 602 may be determined based on the voltage across the input terminals (630, 632) and the current flowing into the input terminals (e.g., 630). The efficiency of the isolated converter may be less than the efficiency of the non-isolated converter (e.g., FIG. 2). That is, $\eta_{iso}$ may be less than $\eta$ of the non-isolated converter described previously. However, the overall loss may be reduced if only a fraction of the power flows through the isolated power converter 602. The power losses may be reduced by adjusting the amount of power (e.g., defined by a power ratio) that flows through the isolated converter 602. That is, $P_{b1}$ may controlled to a value that is less than $P_b$. For example, a ratio of $P_{b1}$ to $P_b$ may be controlled to a value of 10%. The total output power delivered to the load 650 is the sum of the power passing through the direct path and the power passing through the isolated power converter 602.

The controller 600 may be programmed to control the amount of power through the isolated power converter 602. To improve overall performance, the power through the isolated power converter 602 may be a small portion of the power provided to the load 650 or power input to the power conversion system. That is, $P_{b1}$ may be selected to be less than the input power, $P_b$, of the non-isolated power converter. $P_{b1}$ may also be selected to be less than the power delivered to the load 650. High circulating currents in the isolated power converter may result in a reduction in overall system efficiency under light load conditions. To improve the overall efficiency of the power conversion system, the power through the isolated power converter 602 may be controlled to a predetermined power level. The power ratio may be defined as the ratio of the power delivered at the input of the isolated power converter 602 to the total power delivered to the electrical load 650. The power ratio may also be defined as the ratio of the power delivered at the input of the isolated power converter 602 to the total power provided by the power source.

The controller 600 may receive or define a voltage reference. The reference voltage may be a nominal voltage that is required by the electrical load 650. The reference voltage may be greater than the voltage of the traction battery 124. The controller 600 may output the control signals to the isolated power converter 602 to output a voltage (e.g., $V_2$) from the isolated power converter such that the voltage across the electrical load 650 satisfies the reference voltage. The reference voltage may affect the power ratio that is selected. For example, as the reference voltage is increased, the power ratio may be increased to satisfy the selected reference voltage. In addition, the controller 600 may measure the current flowing to the electrical load 650 so that the power delivered to the electrical load 650 may be computed. The controller 600 may measure the voltage across the input terminals (630, 632) of the isolated power converter 602 and the current flowing into the input terminal 630 to determine the power input to the isolated power converter 602. The controller 600 may compute the ratio of power input to the isolated power converter 602 to the power delivered to the electrical load 650. The controller 600 may compare the power ratio to a predetermined range of power ratios that may represent the desired range of power ratios. The controller 600 may receive or determine a reference power ratio. The reference power ratio may a power ratio that yields a predetermined power conversion system efficiency. For example, the selected power ratio may reduce power losses when compared to using a non-isolated power converter (e.g., FIG. 2). The reference power ratio may represent a maximum power ratio to achieve improved efficiency.

The controller 600 may operate the isolated power converter 602 to achieve the reference power ratio. For example, the controller 600 may output gate drive signals to the input stage switching devices of the isolated power converter 602 to change the frequency and/or magnitude of the current through the primary-side of the transformer to achieve the reference power ratio. The controller 600 may be programmed to adjust the power ratio at specified time intervals (e.g., sampling rate). As the power demand of the electrical load 650 increases, the controller 600 may adjust the power ratio to maintain the reference power ratio and achieve the reference voltage. By controlling the power ratio to the reference power ratio, the overall efficiency of the power conversion system may be improved.

The power conversion system may further include a switching element 638 that is configured to selectively couple the output terminals of the isolated converter 602. The switching element 638 may be a relay or a solid-state switching device (e.g., MOSFET, IGBT). The controller 600 may include an interface for a control signal for the switching element 638. The switching element 638 allows the isolated converter 602 to be removed from the power path. When the switching element 638 is closed, the traction battery 124 is coupled directly to the load. When the switching element 638 is closed, the controller 200 may command the switching devices of the isolated converter 602 to be inactive. In the closed state, there may be no power conversion losses as the traction battery 124 and/or high-voltage bus is directly coupled to the load 650. When a higher voltage is beneficial, the switching element 638 may be opened and some portion of the power may be directed through the isolated converter 602.

The controller 600 may be programmed to operate the switching element 638 to be open or closed based on the operating conditions. When the operating conditions are such that the traction battery voltage is desired, the controller 600 may cause the switching element 638 to close. Before closing the switching element 638, the controller 600 may ensure that there is no power flow through the isolated power converter 602. When the operating conditions are such that a boosted voltage is desired, the controller 600 may cause the switching element 638 to open. The controller 600 may operate the isolated power converter 602 to boost the voltage to the desired voltage.

Figure 7:
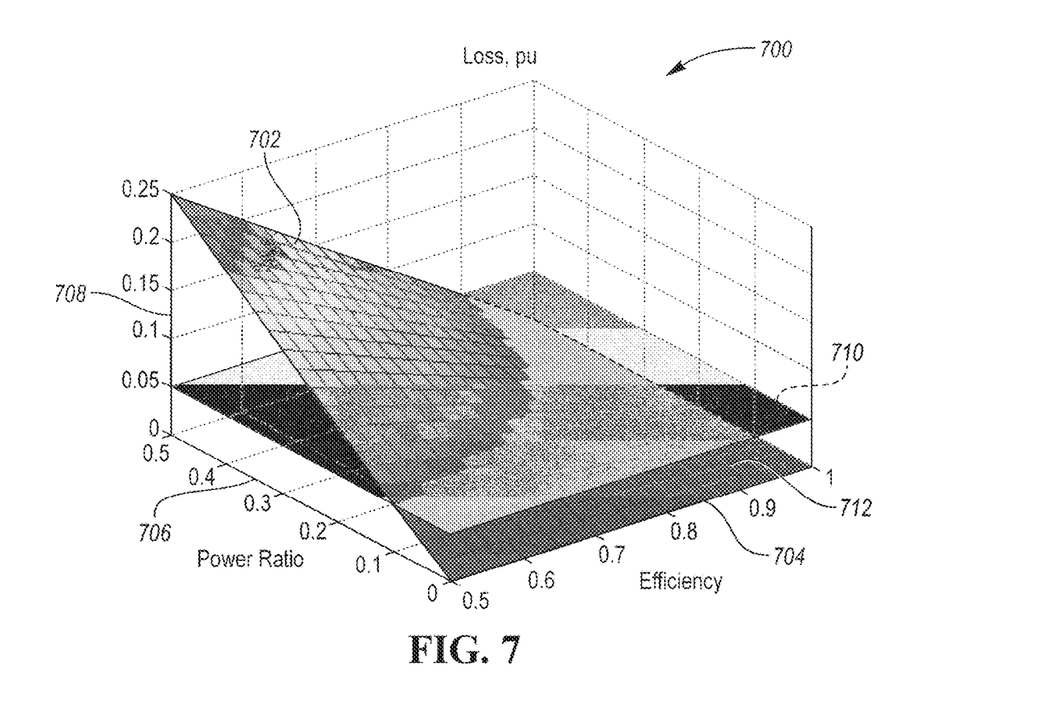
FIG. 7 is a plot depicting power losses for a non-isolated power conversion system and the power conversion system that uses the isolated power converter over a range of efficiencies and power ratios.

FIG. 7 illustrates a plot 700 of percentage losses by using the disclosed power conversion system. An x-axis 704 represents the efficiency of the isolated converter 602. A y-axis 706 represents a power ratio that is the percentage of total power that flows through the indirect path. A z-axis 708 represents the percentage power loss for the converter system. A surface 702 is plotted that represents the converter topology performance for a range of efficiency and power ratios. Performance of a non-isolated power converter (e.g., FIG. 2) is represented by a plane 710 having an efficiency of 95%.

As seen in the plot 700, the surface 702 includes an improved performance range 712 in which the percentage losses are less than those defined by the plane 710 for a range of efficiency and power ratios. The improved performance range 712 represents those combinations of efficiency and power ratios at which the power conversion system has lower losses than a conventional non-isolated converter. The plot 702 depicts that using an isolated power converter 602 to transfer a portion of the power can yield improvements in overall power conversion system efficiency. For example, operating the converter topology using an isolated power converter 602 with an efficiency of 0.8 at a power ratio of 0.1 yields a system with reduce losses compared to a conventional single-path converter with efficiency of 95%. By controlling the power ratio to a predetermined range (e.g., defined by 712) it is possible to improve overall efficiency when compared to the system having a non-isolated power converter (e.g., FIG. 2).

Knowing the efficiency of the isolated power converter 602 enables identification of a maximum power ratio for achieving improved efficiency. For example, at a fixed efficiency value there are a range of power ratios that lie within the improved performance range 712. The maximum desired power ratio may be defined as the power ratio associated with the efficiency value of the isolated power converter 602 that intersects the plane 710. The controller 600 may be programmed to achieve the voltage reference using the minimum possible power ratio. The controller 600 may be programmed to operate the isolated power converter 602 at a power ratio below the maximum desired power ratio. The characteristics (e.g., defined by FIG. 7) may be stored by the controller 600 and retrieved to determine the maximum power ratio. The controller 600 may be programmed to achieve the voltage reference using the minimum possible power ratio that is less than the maximum desired power ratio. By minimizing the power flow through the isolated power converter 602, the overall system efficiency may be improved. That is, conversion power losses may be reduced.

The power conversion system can improve overall efficiency of the power conversion. The power conversion system provides a boosted voltage to an electrical load which can reduce the current requirements for wiring and loads. In addition, the power conversion system is bi-directional and can return energy back to the power source by reversing the operation of the isolated power converter.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an isolated power converter with input terminals coupled to a power source;
a load coupled across a series combination of an output of the isolated power converter and the power source; and
a controller programmed to operate the isolated power converter such that a ratio of power delivered to the input terminals of the isolated power converter to a total power delivered to the load is less than a predetermined ratio.

2. The vehicle of claim 1 wherein the predetermined ratio is selected based on an efficiency of the isolated power converter.

3. The vehicle of claim 2 wherein the controller is further programmed to increase the predetermined ratio in response to the efficiency of the isolated power converter increasing.

4. The vehicle of claim 1 further comprising a switching element configured to selectively short across terminals of the output of the isolated power converter.

5. The vehicle of claim 4 wherein the controller is further programmed to operate the switching element to couple the load across the power source.

6. The vehicle of claim 1 further comprising a capacitor coupled across the series combination.

7. The vehicle of claim 1 wherein the power source is a traction battery.

8. The vehicle of claim 1 wherein the isolated power converter is configured for bi-directional operation.

9. A power conversion system comprising: a power converter having output terminals that are electrically isolated from input terminals; and a circuit configured to couple a voltage input from a power source to the input terminals, and provide an output voltage to a load that is a series combination of the voltage input and a voltage across the output terminals and a controller programmed to operate the power converter such that a ratio of power delivered to the input terminals of the power converter to a total power delivered to the load is less than a predetermined ratio.

10. The power conversion system of claim 9 wherein the output voltage is greater than the voltage input.

11. The power conversion system of claim 9 wherein the predetermined ratio is selected based on an efficiency of the power converter.

12. The power conversion system of claim 9 wherein the predetermined ratio increases as an efficiency of the power converter increases.

13. The power conversion system of claim 9 wherein the circuit further includes a switching element disposed across the output terminals configured to selectively short circuit the output terminals.

14. The power conversion system of claim 9 further comprising a capacitor coupled across the series combination.

15. The power conversion system of claim 9 wherein the power converter is configured for bi-directional operation.

16. A method comprising:
   coupling a power source to an input of an isolated power converter;
   coupling an output of the isolated power converter in series with the power source to provide power to an electrical load; and
   operating the isolated power converter at a power level such that a ratio of power provided to the isolated power converter to a total power delivered to the electrical load is less than a predetermined ratio.

17. The method of claim 16 wherein the predetermined ratio is based on an efficiency of the isolated power converter.

18. The method of claim 17 wherein the predetermined ratio increases as the efficiency increases.

19. The method of claim 16 wherein the predetermined ratio is selected such that a power loss associated with providing power to the electrical load is less than a conversion power loss associated with using an output of a non-isolated power converter across the electrical load.

* * * * *